J. M. COLSON.
Horse Hay-Rake.
No. 106,554.          Patented Aug. 23, 1870.
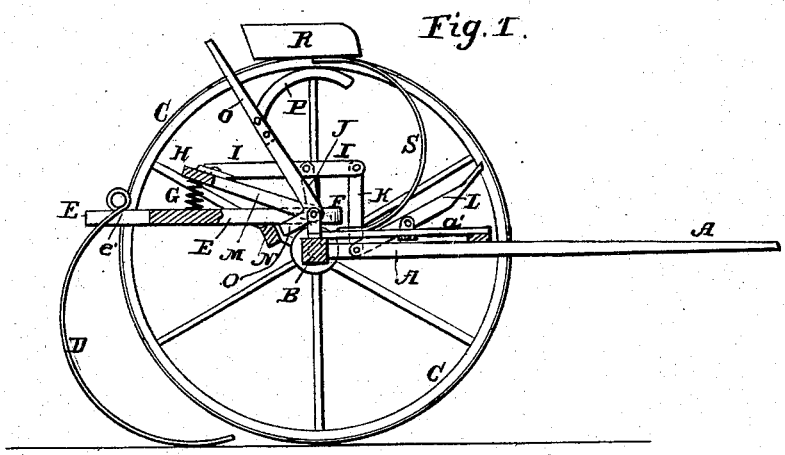
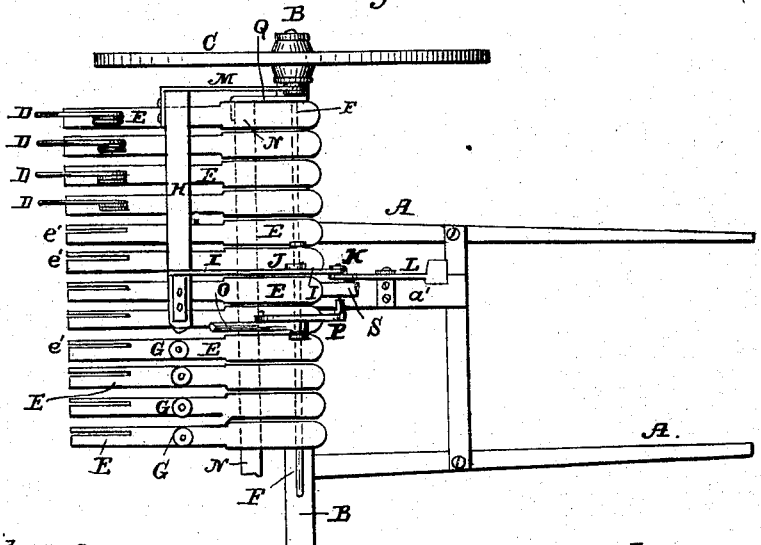

UNITED STATES PATENT OFFICE.

JAMES M. COLSON, OF MORRILL, MAINE.

IMPROVEMENT IN HORSE HAY-RAKES.

Specification forming part of Letters Patent No. 106,554, dated August 23, 1870.

*To all whom it may concern:*

Be it known that I, JAMES M. COLSON, of Morrill, in the county of Waldo and State of Maine, have invented a new and useful Improvement in Horse Hay-Rake; and I do hereby declare that the following is a full, clear, and exact description thereof, which will enable others skilled in the art to make and use the same, reference being had to the accompanying drawing, forming part of this specification, in which—

Figure 1 is a detail vertical section of my improved rake. Fig. 2 is a top view of the same, parts being broken away to show the construction.

Similar letters of reference indicate corresponding parts.

My invention has for its object to furnish an improved horse-rake which shall be simple in construction, easily operated, strong, durable, not liable to get out of order, and effective in operation; and it consists in the construction and combination of various parts of the rake, as hereinafter more fully described.

A are the thills, the rear ends of which are rigidly attached to the axle B, upon the journals of which revolve the wheels C.

D are the rake-teeth, the lower ends of which are bent upward slightly, so that their points will not come in contact with the ground to injure the roots of the grass, the said teeth sliding upon their bends.

The teeth D are made of elastic wire, and their upper ends pass up through slots $e'$ in the rear ends of the bars E, have two or three coils formed in them, and their ends are passed down through and are secured to the said bars E, the slotted bars E thus allowing the teeth D to spring freely rearwardly while supporting them laterally.

The bars E are arranged side by side, each independent of the others, and through their forward ends is passed a long rod, F, which also passes through short standards attached to the axle B, so as to pivot the said bars to the said axle.

To the upper side of the rear part of each of the bars E is attached the lower end of a coiled spring, G, upon the free upper ends of which rests the bar H, which extends entirely across the rake, and is rigidly attached to the rear end of the lever I, which is pivoted to the upper end of the bar J, through the lower end of which passes the rod F.

The forward end of the lever I is pivoted to the upper end of the bar K, the lower end of which is pivoted to the rear end of the foot-lever L, which is pivoted to a support attached to the bar, plank, or platform $a'$, which is secured to the thills A and axle B.

The forward end of the lever L extends into such a position that it may be conveniently reached and operated by the driver with his foot, so that by bearing down upon the lever K he may hold the rake-teeth pressed down closely to the ground.

To the end of the bar H are attached arms M, the forward ends of which are pivoted to the rear ends of the rod F, to give steadiness to its movements.

N is a bar extending entirely across the rake beneath the bars E, and which is attached to the rear end of the bent lever O, which is pivoted at its angle to the rod F, and the forward end of which extends up into such a position that it may be conveniently reached and operated by the driver from his seat.

To the side of the lever O is attached an arm or lever, P, which projects forward and has a foot-rest formed upon its end, so that the rake may be operated by the driver with his foot or hand, to raise the rake-teeth from the ground to discharge the collected hay, or to hold the said rake-teeth away from the ground while passing from place to place.

To the ends of the bar N are attached the rear ends of the bars Q, the forward ends of which are pivoted to the rod F, to give steadiness of movement to the said bar when being operated.

R is the driver's seat, which is attached to the upper end of the spring-bar S, the lower end of which is attached to the bar, plank, or platform $a'$.

Having thus described my invention, I claim as new and desire to secure by Letters Patent—

An improved horse hay-rake, formed by the combination of the thills A, axle B, wheels C, spring-teeth D, slotted and pivoted bars E, pivoting-rod F, coiled springs G, long cross-bar H, lever I, pivoted bars J and K, foot-lever L, pivoted arms M, long cross-bar N, bent hand and foot lever O P, pivoted bars Q, and driver's seat R S with each other, substantially as herein shown and described, and for the purpose set forth.

JAMES M. COLSON.

Witnesses:
GEORGE F. ALLEN,
GORHAM CLOUGH.